United States Patent [19]

Du et al.

[11] Patent Number: 5,185,760
[45] Date of Patent: Feb. 9, 1993

[54] AERODYNAMIC WINDOW FOR A GAS LASER

[75] Inventors: Keming Du; Joachim Franek; Peter Loosen, all of Aachen, Fed. Rep. of Germany

[73] Assignee: Fraunhofer-Gessellschaft zur Forderung der angewandten Forschung e.V., Fed. Rep. of Germany

[21] Appl. No.: 635,619

[22] PCT Filed: Jun. 29, 1989

[86] PCT No.: PCT/DE89/00432

§ 371 Date: Feb. 28, 1991

§ 102(e) Date: Feb. 28, 1991

[87] PCT Pub. No.: WO90/00319

PCT Pub. Date: Jan. 11, 1990

[30] Foreign Application Priority Data

Jun. 29, 1988 [DE] Fed. Rep. of Germany ....... 3821836

[51] Int. Cl.⁵ ................................................. H01S 3/08
[52] U.S. Cl. ..................................... 372/104; 372/103; 359/894
[58] Field of Search ................. 372/104, 103; 350/319

[56] References Cited

U.S. PATENT DOCUMENTS

| | | | |
|---|---|---|---|
| 4,013,977 | 3/1977 | Behrens | 372/104 |
| 4,721,370 | 1/1988 | Goede | 372/104 |
| 4,821,283 | 4/1989 | Wildermuth et al. | 372/104 |

*Primary Examiner*—Léon Scott, Jr.
*Attorney, Agent, or Firm*—Evenson, Wands, Edwards, Lenahan & McKeown

[57] ABSTRACT

Aerodynamic window for a gas laser, whose active chamber emits a focussed laser beam and is flow connected by means of a beam passage opening with a window chamber connected to a vacuum pump and which has a beam exit opening in an outer area which is preferably under atmospheric pressure. In order to reduce the pumping power necessary for the aerodynamic window and improve the laser beam quality, the window is so constructed that the laser beam emitted by the active chamber has a first focus in the vicinity of the beam passage opening and is deflected onto a focussing mirror arranged in the window chamber and which gives the laser beam leaving the latter a second focus located in the vicinity of the beam exit opening.

9 Claims, 3 Drawing Sheets

AERODYNAMIC WINDOW FOR A GAS LASER

DESCRIPTION

1. Technical Field

The invention relates to an aerodynamic window for a gas laser, whose active chamber emits a focussed laser beam and is flow connected by means of a beam passage opening with a window chamber connected to a vacuum pump and which has a beam exit opening in an outer area which is preferably under atmospheric pressure.

2. Prior Art

Laser radiation is emitted from the active chamber through a beam passage opening, which forms a so-called window, which in the case of gas lasers must prevent the exit of active material, i.e. the gas from the active chamber. This window is normally made from a radiation-transparent, solid material. In the case of high power lasers the materials absorb so much energy, that they can no longer be used. They are replaced by aerodynamic windows, in which moving gas is used for sealing purposes. Such a flow is e.g. obtained by a differential pump. The sealing action of said aerodynamic window is essentially based on the fact that a window chamber is present from which pumping takes place with a vacuum pump. Such a window with the aforementioned features is known from DE-OS 35 10 057. The window chamber is arranged under an angle to the laser beam axis and the beam passes through the window chamber undeflected by the beam passage opening and the beam exit opening. The two said openings are located in walls which are at right angles to one another, in order to have a minimum length radiation path in the area through which there is a turbulent flow located between the openings. This turbulent flow significantly disturbs the beam quality. In the case of the known aerodynamic window it is also disadvantageous that the said openings are inclined with respect to the laser beam, so that the cross-sectional surface thereof for passing through the laser beam in unimpeded form must be larger than if they were positioned at right angles to the laser beam. This leads to an increased pump delivery volume and consequently to an increased energy expenditure, together with increased disturbance to the beam quality.

DESCRIPTION OF THE INVENTION

The problem of the present invention is to so improve an aerodynamic window of the aforementioned type, that a comparable sealing action of the beam passage opening is obtained with reduced pumping power and with an improved beam quality.

This problem is solved in that the laser beam emitted by the active chamber has a first focus located in the vicinity of the beam passage opening and is deflected onto a focussing mirror positioned in the window chamber and the laser beam leaving the said chamber is given by the said mirror a second focus located in the vicinity of the beam exit opening.

It is important for the invention that the laser beam has in the vicinity of the two beam openings in each case a minimum possible cross-section and consequently the two beam openings can be minimized with respect to their cross-section. Due to the fact that the opening cross-sections are small, for specific pressure differences there is a smaller gas flow through the beam openings. Thus, less laser gas flows out of the active chamber and into the window chamber and less air has to be pumped out of the latter, because the air inflow through the beam exit opening is comparatively small. In connection therewith less air can diffuse into the laser chamber than in the case of conventional aerodynamic windows. On the basis of reduced gas or air quantities, it can be assumed that the flow rates are smaller and consequently so is the flow-caused, optical influencing of the laser beam, which therefore has a higher beam quality. In order to minimize laser gas losses, the window chamber pressure can be at a value which is only slightly smaller than that in the active chamber.

In an embodiment of the invention the beam passage openings and the beam exit openings are closely juxtaposed with a spacing corresponding to an acute reflection angle at the focussing mirror. As a result that area in which the laser beam is influenced by flowing gases in the sense of a deterioration of the optical quality is reduced to a minimum. Due to the acute reflection angle the deflection of the laser beam by the focussing mirror remains small, so that the window chamber volume can also remain small, which leads to relatively low constructional expenditure.

The longitudinal extension of the window chamber in the direction of the laser beam emitted by the active chamber exceeds its diameter and has the focussing mirror at its chamber end opposite to the beam passage opening, the vacuum pump being connected to the window chamber in the vicinity of the beam exit opening. These features also improve the aerodynamic window, in that gas flows leading to optical interference to the laser beam are essentially limited to a specific area of the window chamber, whilst another window chamber area having the focussing mirror is only slightly influenced by the flow. The comparatively great beam length within the window chamber consequently does not negatively influence the optical quality of the beam. In this sense the window chamber is cylindrical and the two beam openings are located in the end wall facing the focussing mirror.

The window chamber has at least two facing pump connections, which are arranged symmetrically to the beam openings, so that a relatively symmetrical gas flow is obtained, which reduces the influence on the beam quality.

To keep the disturbance of the laser beam by gas flow small, the beam passage and/or beam exit openings are nozzle-shaped, reference being e.g. made to the Laval nozzle. Other flow-favourable designs for the beam openings are also suitable.

In a further development of the invention the aerodynamic window is so constructed for easy beam guidance that the laser beam emitted by the active chamber receives its first focus from a first aberration-free parabolic mirror and that the laser beam emitted by the focussing mirror from the window chamber is recollimated by a second aberration-free parabolic mirror. The number of mirrors required for the aerodynamic window is in this case as small as possible. However, this small number of optical components still provides a faultless beam imaging. For reducing the number of components the focussing mirror in the window chamber is a single elliptical mirror.

However, the aforementioned mirrors are not spherical, i.e. their manufacturing costs are many times higher than those for spherical mirrors. In order to also be able to image the laser beam in faultless manner in the case of spherical mirrors, the window is constructed in such a way that the laser beam emitted by the active chamber receives its first focus from a spherical mirror and the laser beam emitted by the window chamber receives the second focus from two spherical mirrors forming the focussing mirror, the beam path plane defined by the two spherical mirrors arranged in the window chamber being at right angles to the beam path plane defined by the spherical mirror located in the active chamber.

BRIEF DESCRIPTION OF THE DRAWINGS

The invention is described hereinafter relative to embodiments and the attached drawings, wherein show.

BEST WAY FOR PERFORMING THE INVENTION

Figure 1:
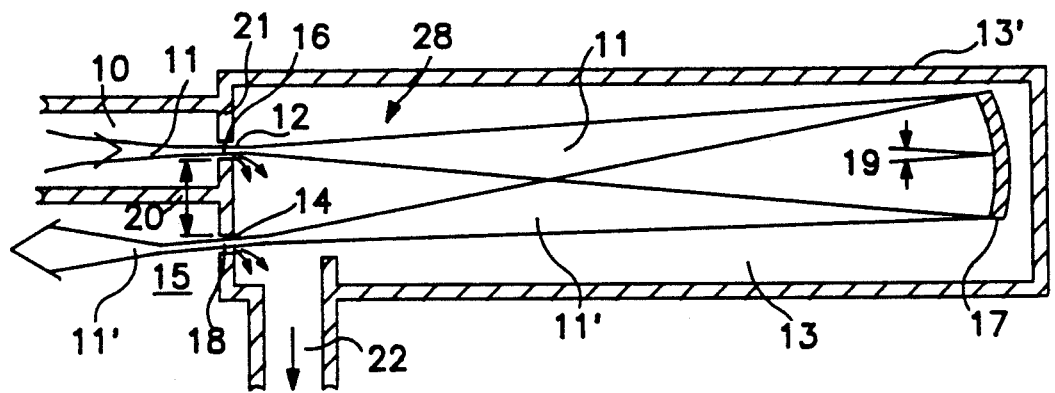
FIGS. 1 and 2 cross-sectional representations of two embodiments of aerodynamic windows.
Figure 2:
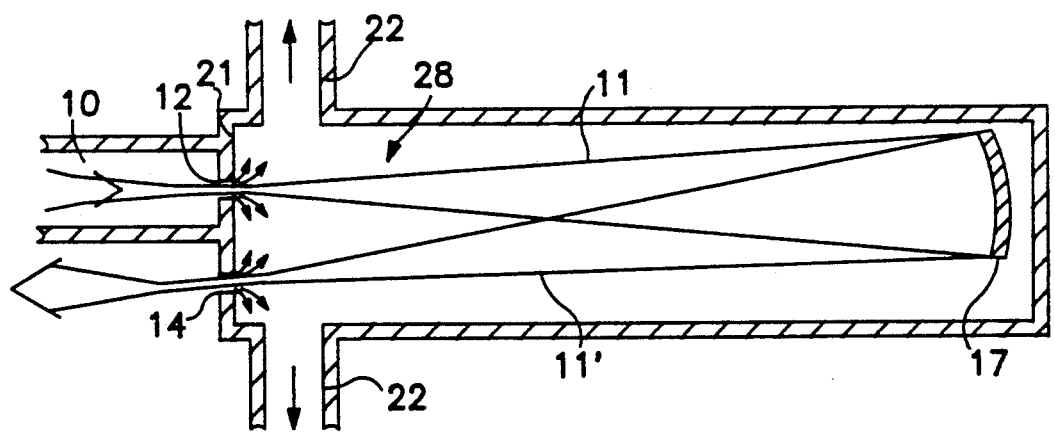

The aerodynamic window is used for a gas laser, whose active chamber 10 is shown diagrammatically in FIGS. 1 and 2. In the said chamber 10 the laser gas is at a low pressure of e.g. somewhat above 100 mbar. The laser beam 11 produced by the laser gas leaves the chamber 10 through a beam exit opening 12, which is formed by a hole having a diameter of e.g. 2 mm. Through the beam passage opening 12 the laser beam 11 passes into the window chamber 13, which has a comparatively great longitudinal extension and at its end 13' facing the opening 12 has a focussing mirror 17, which reflects the laser beam. The focussing mirror 17 directs the laser beam 11' onto a beam exit opening 14 of the chamber 13 through which the laser beam 11' passes out into the outer area 15, which is under atmospheric pressure. According to FIGS. 1 and 2 the beam guidance is such that in the vicinity of the beam passage opening 12, the laser beam 11 has a first focus 16 and in the vicinity of the beam exit opening 14 a second focus 18. The double focussing of the laser beam onto the beam openings 12 and 14 ensures that in the vicinity of these two openings the laser beam has its minimum diameter and consequently the openings 12, 14 can be as small as possible.

To the aerodynamic window 13 is connected a vacuum pump, whose pump connection is 22. The latter is located in the vicinity of openings 12, 14, which are positioned in the end wall 21 of the cylindrical window chamber 13. As a result of this arrangement of the openings 12, 14 and the pump connection 22 in the vicinity thereof, in the case of an appropriately high vacuum, the gas flow illustrated at the openings 12, 14 is obtained on the one hand from the laser chamber 10 and from the outer area 15 on the other and which flows into the interior of the window chamber 13. The inflowing gas is pumped off by the vacuum pump.

FIG. 2 differs from FIG. 1 essentially in that there are two facing pump connections 22. Thus, there is a symmetrization of the flow, as is indicated by the arrows. The gas flow from the openings 12,14 consequently takes place to the pump connections 22, so that a corresponding flow symmetry is obtained in the vicinity of the openings 12,14 and shortly thereafter, i.e. in the area where the laser beam quality influencing is at a maximum.

If it is assumed in the cases of FIGS. 1 and 2 that the pressure in the window chamber 13 is 100 mbar and the diameter of the openings 12,14 is 2 mm, in the case of a maximum delivery of 1.3 g/s, there is a delivery volume of 600 l/min. The latter largely consists of air and to a smaller part of the laser gas flowing out from the laser chamber 10, because the pressure difference between the chambers 10,13 is comparatively small. The gas flow which occurs on pumping out mainly appears in the area 28 of the chamber 13 close to the end wall 21, whereas the focussing mirror 17 is positioned at the opposite chamber end 13 in an area where there is only a small through-flow. The focussing mirror 17 is an elliptical mirror with comparatively small radial extensions. It is also located in a very small acute reflection angle 19 to the laser beam 11 striking it, so that the area taken up by the latter and the reflected laser beam 11' is comparatively small. Therefore the window chamber 13 can be small and is cylindrical. The openings 12,14 are closely juxtaposed with a small spacing 20 corresponding to the acute angle 19 in the end wall 21.

Figure 3:
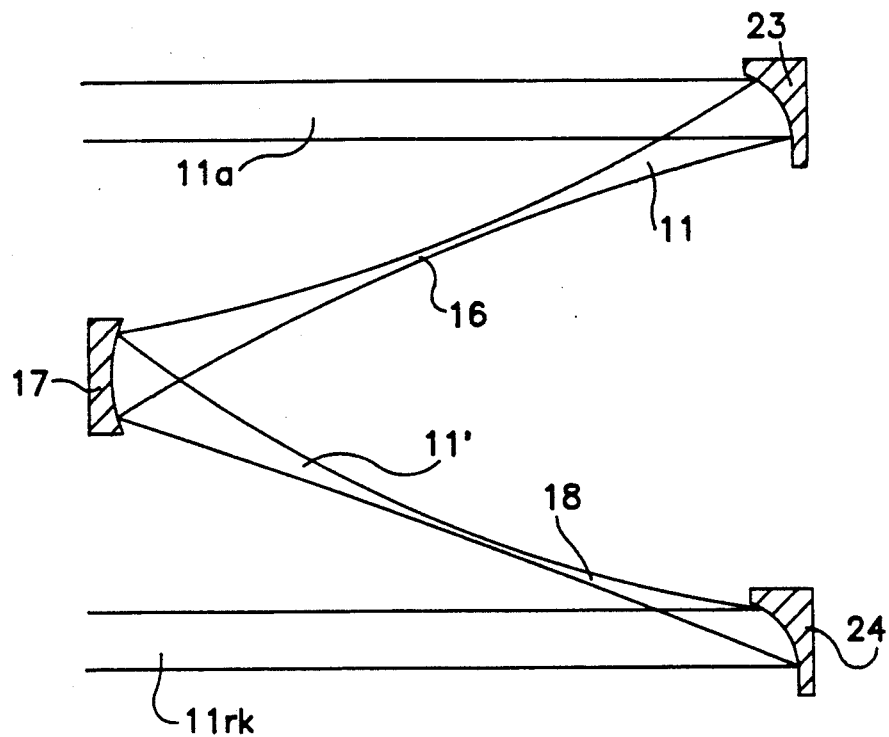
FIG. 3 the arrangement of three mirrors for beam guidance in the case of an aerodynamic window according to the invention.
Figure 4:
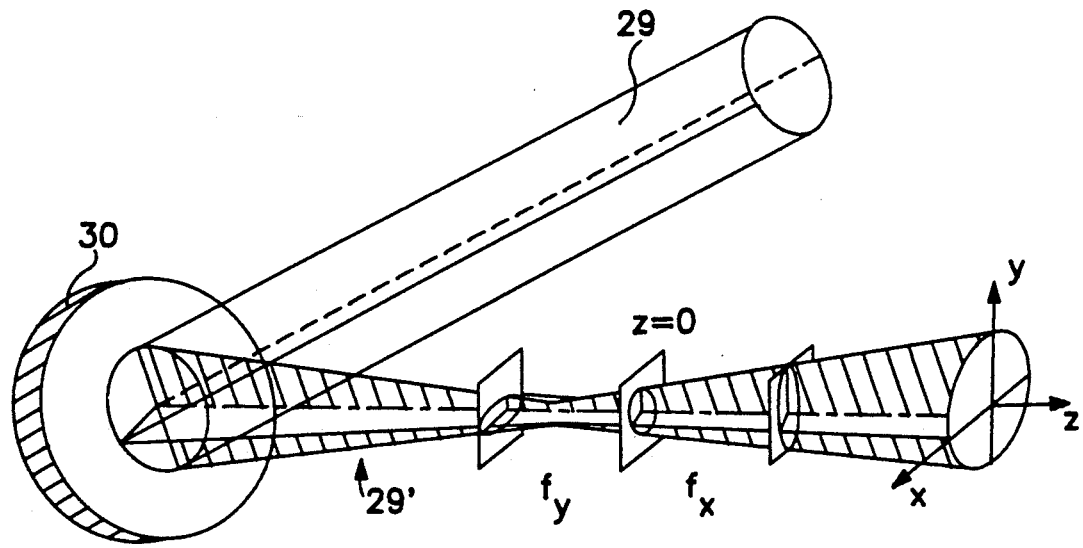
FIG. 4 a view illustrating an imaging error in the case of spherical mirrors.

FIG. 3 shows the path of the laser beam in the vicinity of the aerodynamic window between the necessary optical components. The laser beam 11a made available by the laser reaches a parabolic mirror 23 with which the laser beam 11 receives in aberration-free manner a first focus 16. In the vicinity of the latter are located the beam passage openings 12 provided in FIGS. 1 and 2. The elliptical mirror 17 deflects the laser beam and gives it in the vicinity of the beam 11' a second focus 18, in the vicinity of which is provided the beam exit opening 14. The laser beam 11' then strikes a parabolic mirror 24, which emits a recollimated laser beam 11rk, which is available for further use. The parabolic mirrors 23,24 are aberration-free, so-called off-axis mirrors. Thus, using these optical components the laser beam can be guided in aberration-free manner. However, the manufacture of such optical components involves comparatively high costs. The aim is therefore to guide the laser beam with spherical mirrors but, according to FIG. 4, the latter have undesired aberrations.

Figure 5:
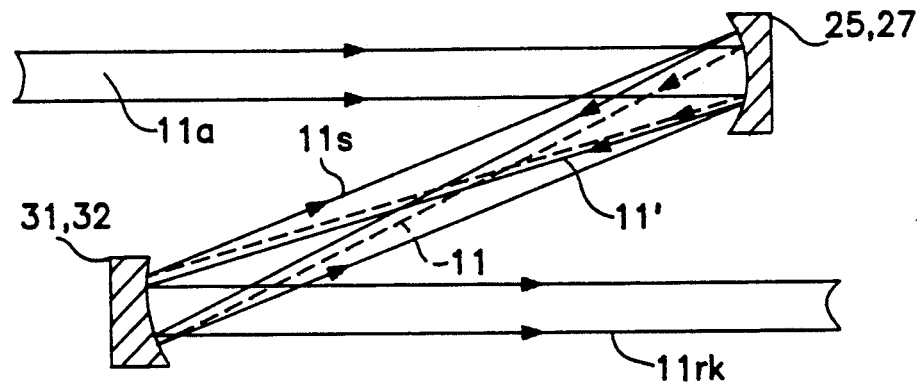
FIGS. 5 to 7 an arrangement comprising spherical mirrors for guiding the beam of an aerodynamic window.
Figure 6:
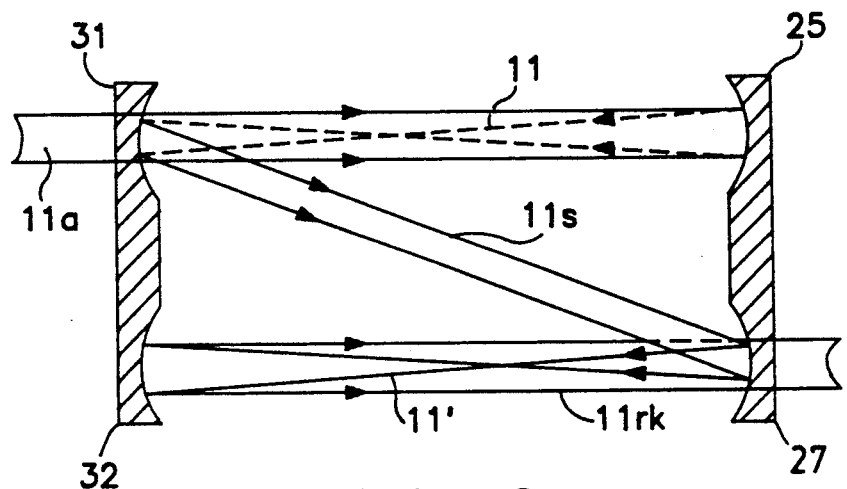
Figure 7:
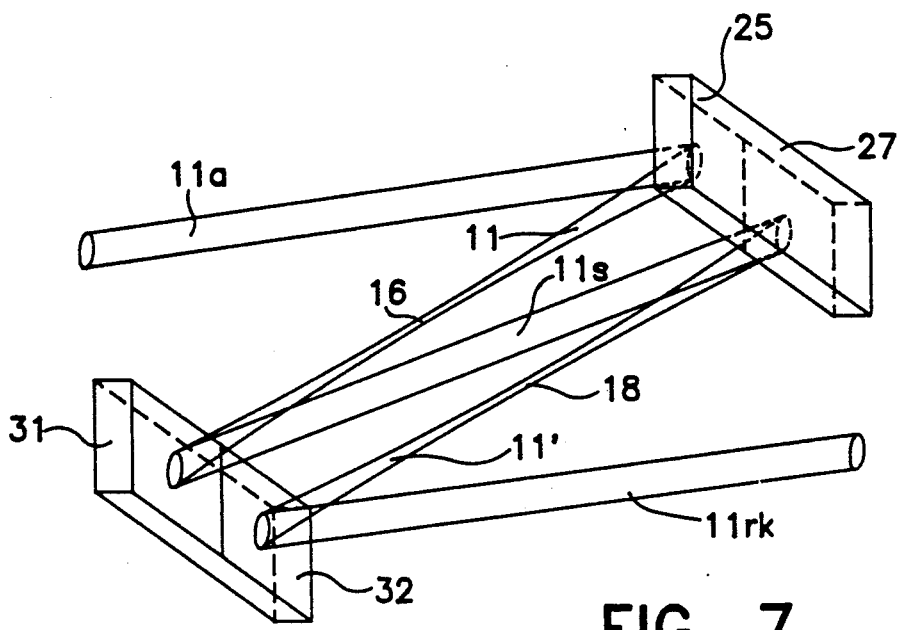

If a laser beam 29 strikes a spherical mirror 30, astigmatism occurs on the reflected beam bundle. The beam is more strongly focussed in the plane of incidence, in this case the YZ plane, than in the XZ plane. This leads to the represented different foci fy and fx for the Y and X coordinates. Up to the focus fy the beam is flattened in the Y direction and subsequently is increasingly flattened in the X direction. Intermediately there is a circular cross-section of the beam bundle, but this is comparatively large and is unusable for minimizing the openings 12,14. Such a beam 29' with astigmatic faults can be recollimated if a further spherical mirror is used, whose plane of incidence is at right angles to the plane of incidence of the upstream spherical mirror. Such an arrangement is shown in FIGS. 5 to 7. In all the drawings the mirrors 25,27,31,32 are shown diagrammatically in a spatial arrangement, but without spatial reference to a necessary window chamber 13. It is obvious that their spatial components must also be present, i.e. with the necessary openings 12,14 and with the pump connections 22, the openings 12,14 being in the vicinity of the foci 16,18.

The laser beam 11a reaches a spherical mirror 25 located in the active chamber 10 and which provides the laser beam with the focus 16. Within the window chamber 13 is positioned a spherical mirror 31, which reflects the laser beam with a beam path portion 11s onto a spherical mirror 27, which is also located in the window chamber and from which the laser beam 11', provided with a focus 18, is reflected through the beam exit opening 14 onto a further spherical mirror 32 located in the outer area 15 and from which the laser beam 11rk can be used for processing. This output beam passes in the direction of the beam 11a which, compared with the arrangements of FIGS. 1 and 2, represents a simplification of the deflection system. FIG. 5 shows the incidence or beam path plane defined by the mirrors 25,31. It is clear that the beam path plane defined by the mirrors 27,32 is at right angles to the aforementioned plane of incidence, so that the astigmatic error is corrected.

We claim:

1. An aerodynamic window for a gas laser, which has an active chamber and emits a focussed laser beam and is flow connected by means of a beam passage opening with a window chamber connected to a vacuum pump and which has a beam exit opening in an outer area which is preferably under atmospheric pressure, characterized in that the laser beam (11) emitted by the active chamber (10) has a first focus (16) in the vicinity of the beam passage opening (12) and is deflected onto a focussing mirror (17,31,27) located in the window chamber (13) and from which the laser beam (11') leaving the window chamber (13) is given a second focus (18) in the vicinity of the beam exit opening (14).

2. An aerodynamic window according to claim 1, characterized in that the beam passage opening (12) and the beam exit opening (14) are closely juxtaposed with a spacing (20) corresponding to an acute reflection angle (19) at the focussing mirror (17).

3. An aerodynamic window according to claims 1 or 2, characterized in that the window chamber (13) has a longitudinal extension in the direction of the laser beam (11) emitted by the active chamber (10) which exceeds its diameter and has the focussing mirror (17) at its end (13') opposite to the beam passage opening (12), and that the vacuum pump is connected to the window chamber (13) in the vicinity of the beam exit opening (14).

4. An aerodynamic window according to claims 1, characterized in that the window chamber (13) is cylindrical and the two beam openings (12,14) are located in the end wall (21) facing the focussing mirror (17).

5. An aerodynamic window according to claims 1, characterized in that the window chamber (13) has at least two facing pump connections (22) arranged symmetrically to the beam openings (12,14).

6. An aerodynamic window according to claims 1, characterized in that the beam passage opening (12) and/or the beam exit opening (14) is nozzle-shaped.

7. An aerodynamic window according to claims 1, characterized in that the laser beam (11) emitted by the active chamber (10) receives its first focus (16) from a first aberration-free parabolic mirror (23) and that the laser beam (11') emitted from the window chamber (11) by the focussing mirror (17) is recollimated by a second aberration-free parabolic mirror (24).

8. An aerodynamic window according to claims 1, characterized in that the focussing mirror (17) located in the window chamber (13) is a single elliptical mirror.

9. An aerodynamic window according to claims 1, characterized in that the laser beam (11) emitted by the active chamber (10) receives its first focus (16) from a spherical mirror (25) located in the active chamber (10), that the laser beam (11') emitted by the window chamber (13) receives the second focus (18) from a spherical mirror (27) forming the focussing mirror and the beam path plane also determined by the spherical mirror (27) positioned in the window chamber (13) is at right angles to the beam path plane determined by the spherical mirror (25) located in the active chamber (10) (representation plane of FIG. 5).

* * * * *